(12) United States Patent
Lee et al.

(10) Patent No.: US 11,670,011 B2
(45) Date of Patent: Jun. 6, 2023

(54) IMAGE COMPRESSION APPARATUS AND LEARNING APPARATUS AND METHOD FOR THE SAME

(71) Applicant: INDUSTRY-ACADEMIC COOPERATION FOUNDATION, YONSEI UNIVERSITY, Seoul (KR)

(72) Inventors: Sang Youn Lee, Seoul (KR); Tae Oh Kim, Seoul (KR); Han Bin Son, Seoul (KR); Hyeong Min Lee, Seoul (KR)

(73) Assignee: INDUSTRY-ACADEMIC COOPERATION FOUNDATION YONSEI UNIVERSITY, Seoul (KR)

(*) Notice: Subject to any disclaimer, the term of this patent is extended or adjusted under 35 U.S.C. 154(b) by 376 days.

(21) Appl. No.: 17/146,313

(22) Filed: Jan. 11, 2021

(65) Prior Publication Data

US 2022/0222864 A1  Jul. 14, 2022

(51) Int. Cl.
  *G06T 9/00* (2006.01)
  *G06T 3/40* (2006.01)
  *G06N 20/20* (2019.01)
  *G06N 3/084* (2023.01)
  *G06N 3/045* (2023.01)

(52) U.S. Cl.
  CPC ............ *G06T 9/002* (2013.01); *G06N 3/045* (2023.01); *G06N 3/084* (2013.01); *G06N 20/20* (2019.01); *G06T 3/4046* (2013.01)

(58) Field of Classification Search
  CPC ....... G06T 9/002; G06T 3/4046; G06N 3/045; G06N 3/084; G06N 20/20; G06N 3/048
  See application file for complete search history.

(56) References Cited

U.S. PATENT DOCUMENTS

2020/0053408 A1* 2/2020 Park ............... H04N 21/440263
2020/0236349 A1* 7/2020 Zhai .................... H04N 19/172

FOREIGN PATENT DOCUMENTS

KR   10-2020-0040027 A   4/2020

* cited by examiner

*Primary Examiner* — Jianxun Yang (57) ABSTRACT

An image compression apparatus includes: an image acquisition unit configured to acquire a raw data image; a pre-processing network configured to receive the raw data image and pre-process the raw data image according to a pattern estimation method learned beforehand; and an encoder unit configured to receive the pre-processed image and compress the pre-processed image according to a pre-designated standard compression technique to output a compressed image. The pre-processing network, which can be added during learning and can be implemented as an artificial neural network, can have learned beforehand by way of a back-propagation of a restoration error through a codec modeling unit that has learned beforehand to simulate a standard codec unit, where the restoration error can be obtained by comparing a restored image obtained based on a simulated decoded image with the raw data image.

15 Claims, 6 Drawing Sheets

IMAGE COMPRESSION APPARATUS AND LEARNING APPARATUS AND METHOD FOR THE SAME

BACKGROUND

1. Technical Field

The present disclosure relates to an image compression apparatus and a learning apparatus and method for the same, more particularly to an image compression apparatus and a learning apparatus and method for the image compression apparatus that use image compression modeling to allow standard compatibility.

2. Description of the Related Art

Image compression technology involves expressing image data in a low number of bits while keeping the quality of the image as close as possible to the original and is a technology associated with enhancing the efficiency of transmission and storage by reducing the amount of data for expressing an image.

Image compression techniques can be divided largely into block-based coding techniques and prediction-based coding techniques. A block-based coding technique generally entails partitioning an image into block units that include a certain number of pixels and then compressing the image by encoding through the procedures of frequency conversion, quantization, and entropy coding. More specifically, a frequency conversion is applied to the image to separate low-frequency components and high-frequency components, and the high-frequency components are divided through quantization in consideration of the fact that a person's vision is affected more by low-frequency components. That is, the information of the image data is minimized by way of quantization. Then, through entropy coding, values that frequently occur are assigned small bit symbols, while values that do not frequently occur are assigned large bit symbols for a final conversion into binary signals.

The decoding of an image compressed using the block-based coding technique may follow a reverse order of the encoding, and during the decoding process, a quantization table for each frequency component is needed.

In a prediction-based coding technique, the procedures of conversion, quantization, and entropy coding may be the same as in the block-based coding technique, except that a prediction procedure is added before the conversion. Prediction-based coding takes advantage of the fact that many parts of a screen occur repeatedly and that, in video clips in particular, there is a high correlation with the previous frame. In the prediction procedure, a current block may be predicted using information on the image compressed up until then. After the prediction, only the difference values may be sent to the conversion procedure, so that a smaller amount of information may be encoded compared to converting all of the original data as is.

The decoding procedure for a prediction-based coding technique may use the same prediction algorithm as that of the encoding procedure to sum the binary signals and estimate the original image.

The performance of such image compression should be such that the PSNR (peak signal to noise ratio) is maintained as much as possible while the image is expressed with a small amount of binary bits, i.e. a high bitrate. This can be adjusted according to the quantization level, which poses a trade-off where a stronger quantization would lose more information and result in a lower image quality whereas a weaker quantization would keep more information for an enhanced image quality. The image compression performance may be evaluated based on how high the result reaches on a PSNR-bitrate curve.

Such image compression technology is generally standardized because of problems of compatibility, etc., among numerous media formats. As typical examples, block-based coding techniques prescribe still image compression standards such as JPEG (Joint Photographic Experts Group), JPEG2000, etc., and prediction-based coding techniques prescribe video compression standards such as H.264, HEVC, etc.

Due to recent advances in information communication technology, however, it is difficult to satisfy user demands with standardized image compression techniques only. Thus, various technologies for enhancing the compression rate based on standard image compression techniques have been proposed. Technologies for enhancing the compression rate based on standard image compression techniques mainly address prediction performance enhancement, conversion, quantization, quality enhancement, etc. A method for prediction performance enhancement may entail increasing the accuracy of predictions by adding a novel prediction mode, using prediction based on machine learning, etc., so that the prediction-based coding methods, which convert only the differences, need to convert a reduced amount of differences, whereby the number of bits can be reduced. As regards conversion, while the discrete cosine transform is generally used, compression methods that convert more information as low frequency have been proposed, including methods that use the frequency domain transform which has a better basis and methods that learn the basis using machine learning. As regards quantization, methods have been studied that reduce the number of bits by applying finer quantization in areas having greater amounts of information and larger quantization in areas predicted to have smaller amounts of information.

However, these methods fundamentally require modifying the compression standard algorithm therein and therefore are not readily compatible with existing standard compression techniques.

As such, to enhance quality as much as possible while maintaining standard compatibility, post-compression quality enhancement techniques have been proposed, which use a pixel adaptive noise reduction filter that restores the quality of an intermediate result or a final result of decoding after compression to be close to the original or use an artificial neural network such as a convolutional neural network (hereinafter referred to as a CNN). However, post-compression quality enhancement techniques enhance quality based not on the original image but on the decoded image, so that the performance of the quality enhancement is limited by the information of the original image that is lost during the compression and decoding procedures.

SUMMARY OF THE INVENTION

An objective of the present disclosure is to provide an image compression and a learning apparatus and method for the image compression apparatus that can enhance the quality of a restored image while maintaining compatibility with standard image compression techniques.

Another objective of the disclosure is to provide an image compression and a learning apparatus and method for the image compression apparatus that can apply learning to a pre-processing network for enhancing the quality of a restored image while using a codec modeling network that simulates a standard image compression technique to maintain compatibility with a standard image compression technique.

Still another objective of the disclosure is to provide an image compression and a learning apparatus and method for the image compression apparatus that, in addition to the codec modeling network simulating a standard image compression technique, further includes a bit estimation network for simulating the bit stream structure of the compressed image to enhance the quality of the restored image by improving the compression rate in the standard image compression technique.

An embodiment of the disclosure, conceived to achieve the objectives above, provides an image compression apparatus that includes: an image acquisition unit configured to acquire a raw data image; a pre-processing network configured to receive the raw data image and pre-process the raw data image according to a pattern estimation method learned beforehand; and an encoder unit configured to receive the pre-processed image and compress the pre-processed image according to a pre-designated standard compression technique to output a compressed image.

The pre-processing network can be added during learning and can be implemented as an artificial neural network, where the pre-processing network can have learned beforehand by way of a backpropagation of a restoration error through a codec modeling unit, the codec modeling unit can have learned beforehand to simulate a standard codec unit that includes the encoder unit and a decoder unit configured to obtain a decoded image by receiving and decoding the compressed image, the restoration error can be obtained by comparing a restored image with the raw data image, the restored image can be obtained based on a simulated decoded image outputted from the codec modeling unit.

The codec modeling unit can include: a codec modeling network that has learned to simulate the standard codec unit which includes the encoder unit and the decoder unit, where the codec modeling network can be configured to receive the compressed image and output a simulated decoded image corresponding to a decoded image; a bit estimation network that is configured to receive the pre-processed image pre-processed at the pre-processing network and estimate the number of bits of the compressed image outputted from the encoder unit based on the pre-processed image according to a pattern estimation method learned beforehand; and a model learning unit that is configured to backpropagate a modeling error to the codec modeling network and backpropagate a bit error to the bit estimation network during model learning for applying learning for the codec modeling network and the bit estimation network, where the model learning unit can obtain the modeling error by comparing the simulated decoded image with the decoded image obtained at the decoder unit and can obtain the bit error by comparing the bit number estimated at the bit estimation network with the bit number of the compressed image outputted from the encoder unit.

The image compression apparatus can further include an image learning unit that can be added during pre-processing learning for applying learning to the pre-processing network, where the image learning unit can be configured to obtain a restoration error and backpropagate the restoration error through the codec modeling network and the bit estimation network to the pre-processing network, the restoration error obtained by comparing the restored image obtained by post-processing the decoded image or the simulated decoded image in a pre-designated manner with the raw data image.

The model learning unit can fix the weights of the codec modeling network and the bit estimation network that were configured by the model learning during the pre-processing learning.

In cases where the restored image is obtained from the decoded image or the simulated decoded image by way of post-processing by a post-processing network implemented as an artificial neural network that has learned a pattern estimation method beforehand, the image learning unit can backpropagate the restoration error first to the post-processing network, past the codec modeling network and the bit estimation network, to the pre-processing network.

Another embodiment of the disclosure, conceived to achieve the objectives above, provides a learning apparatus for an image compression apparatus that includes a pre-processing network configured to receive a raw data image and pre-process the raw data image according to a pattern estimation method learned beforehand and an encoder unit that is configured to receive the pre-processed image, compress the pre-processed image according to a pre-designated standard compression technique, and output a compressed image. The learning apparatus may include: a codec modeling unit that is implemented as an artificial neural network and has learned beforehand to simulate a standard codec unit, which may include the encoder unit and a decoder unit configured to obtain a decoded image by receiving and decoding the compressed image, so as to obtain a simulated decoded image from the pre-processed image; and an image learning unit that is configured to apply learning for the pre-processing network by obtaining a restoration error and backpropagating the restoration error through the codec modeling unit, where the restoration error can be obtained by comparing a restored image with the raw data image, and the restored image can be obtained based on the simulated decoded image outputted from the codec modeling unit.

Still another embodiment of the disclosure, conceived to achieve the objectives above, provides a learning method for an image compression apparatus that includes a pre-processing network configured to receive a raw data image and pre-process the raw data image according to a pattern estimation method learned beforehand and an encoder unit that is configured to receive the pre-processed image, compress the pre-processed image according to a pre-designated standard compression technique, and output a compressed image. The learning method may include: obtaining a simulated decoded image from the pre-processed image by using an artificial neural network that has learned beforehand to simulate a standard codec unit, which may include the encoder unit and a decoder unit configured to obtain a decoded image by receiving and decoding the compressed image; and applying learning for the pre-processing network by obtaining a restoration error and backpropagating the restoration error through the artificial neural network, where the restoration error may be obtained by comparing a restored image with the raw data image, and the restored image may be obtained based on the simulated decoded image.

Thus, when an image is compressed and decoded with a standard compression technique, an image compression apparatus and a learning apparatus and learning method for the image compression apparatus according to certain embodiments of the disclosure can provide a pre-processing network to greatly increase the compression rate and enhance the quality of the restored image, all while maintaining compatibility with standard image compression techniques. Also, certain embodiments of the disclosure include a codec modeling network for simulating a standard image compression technique together with a bit estimation network for simulating a bit stream structure of the compressed image, to allow a backpropagation of error to the pre-processing network and thus allow easy learning for the pre-processing network.

Additional aspects and advantages of the present disclosure will be set forth in part in the description which follows, and in part will be obvious from the description, or may be learned by practice of the invention.

DETAILED DESCRIPTION OF THE INVENTION

To sufficiently understand the present disclosure, its advantages, and the objectives achieved by practice of the disclosure, it is necessary to refer to the appended drawings which illustrate preferred embodiments of the disclosure as well as the descriptions provided for the appended drawings.

The present disclosure is described in detail below, through a description of preferred embodiments of the disclosure with reference to the accompanying drawings. However, the disclosure can be implemented in various different forms and is not limited to the described embodiments. For a clearer understanding of the disclosure, parts that are not of great relevance to the disclosure have been omitted, and like reference numerals in the drawings are used to represent like elements.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

Figure 1:
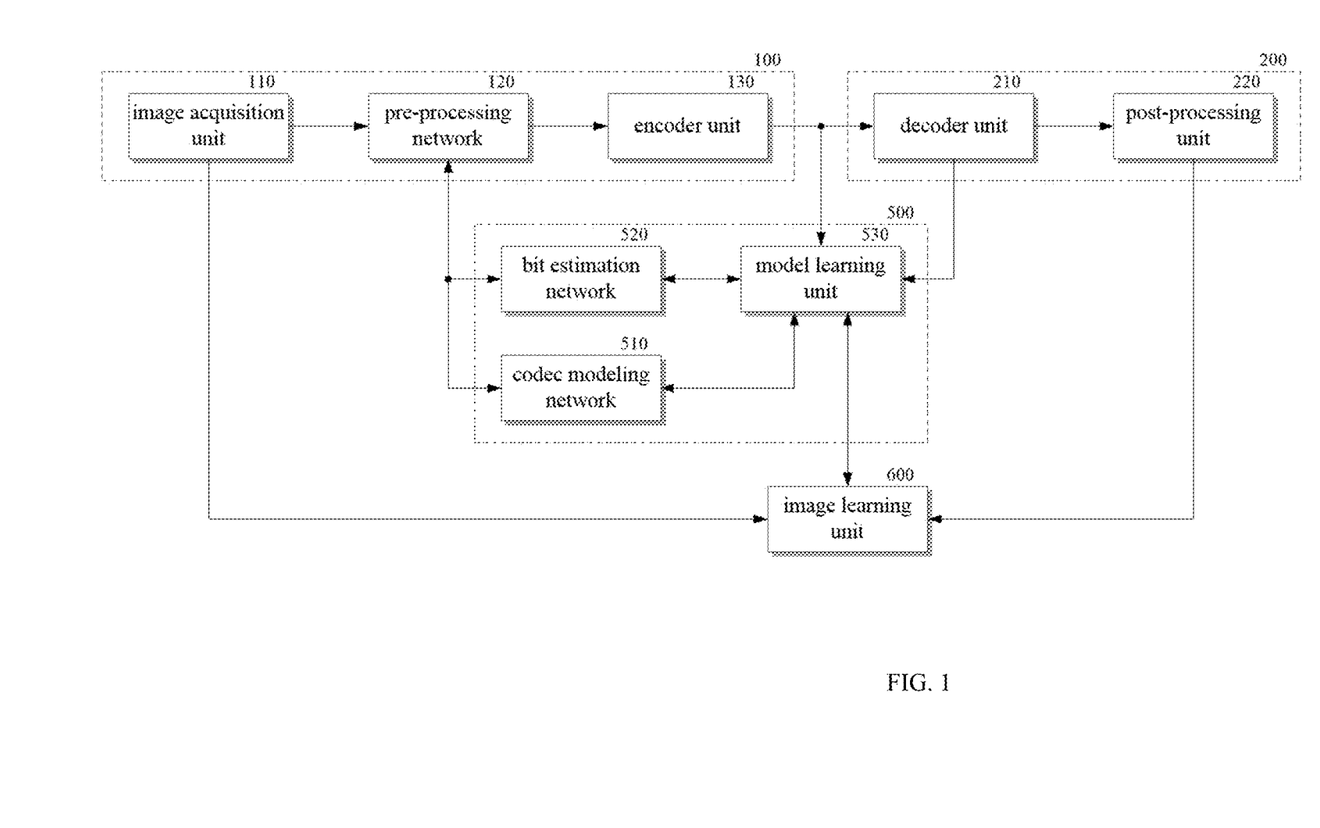
FIG. 1 illustrates the structure of an image compression system according to an embodiment of the disclosure.
Figure 2:
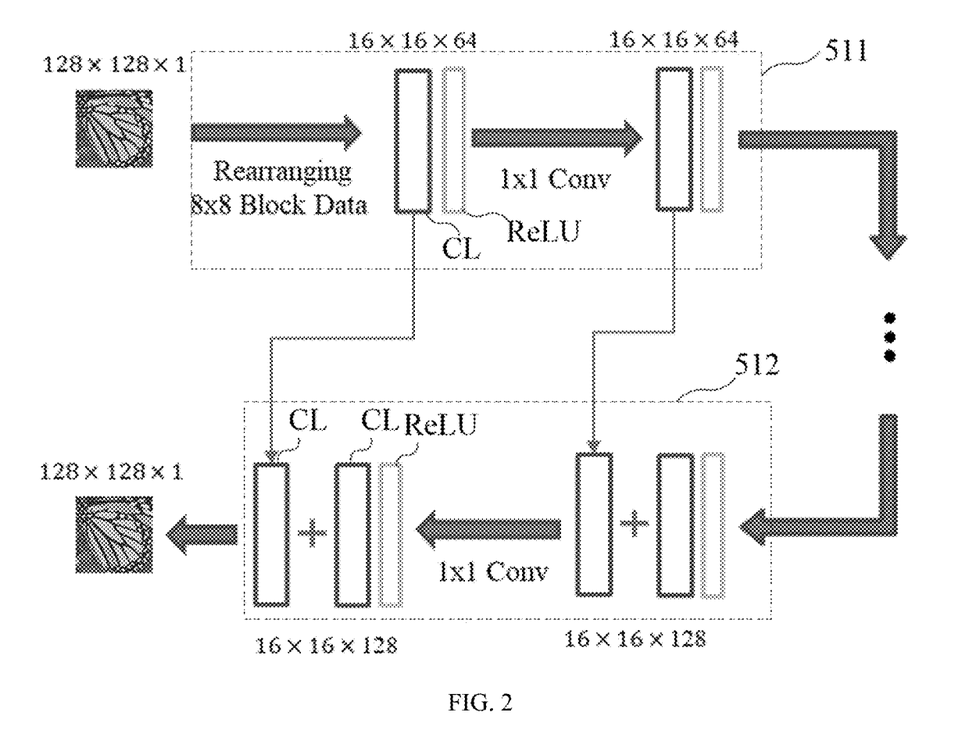
FIG. 2 conceptually illustrates the structure of the codec modeling network of FIG. 1.
Figure 3:
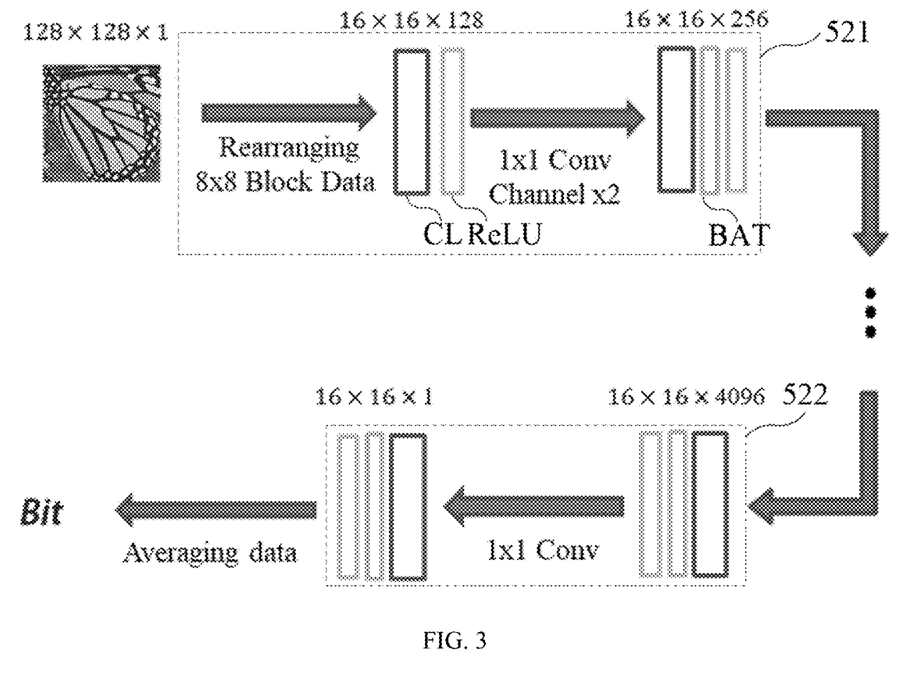
FIG. 3 conceptually illustrates the structure of the bit estimation network of FIG.

FIG. 1 illustrates the structure of an image compression system according to an embodiment of the disclosure, FIG. 2 conceptually illustrates the structure of the codec modeling network of FIG. 1, and FIG. 3 conceptually illustrates the structure of the bit estimation network of FIG. 1.

Referring to FIG. 1, an image compression system according to this embodiment can include an image compression unit 100 that acquires the image requiring compression, pre-processes the acquired image according to a pattern estimation method learned beforehand, compresses the pre-processed image according to a designated standard, and transfers the compressed image, and an image restoration unit 200 that decodes the transmitted compressed image to restore the image by applying decoding in a manner corresponding to the standard compression technique applied to the compressed image.

The image compression unit 100 can include an image acquisition unit 110 that acquires the image requiring compression, a pre-processing network 120 that is implemented as an artificial neural network and pre-processes the acquired image according to a pattern estimation method learned beforehand, and an encoder unit 130 that compresses the pre-processed image by applying encoding according to pre-designated standard compression technique.

First, the image acquisition unit 110 may acquire a raw data image that is to be compressed. Here, the raw data image can be a still image or can be a video clip. The image acquisition unit 110 can be implemented as a camera device that directly captures the raw data image or can be implemented as a storage device, etc., that stores an image acquired by a camera.

The pre-processing network 120 may be an element added to the image compression unit 100 according to this embodiment and may perform pre-processing on the raw data image so that an image post-processed at a post-processing unit 220 of the image restoration unit 200 can be acquired to be as identical as possible to the raw data image acquired at the image acquisition unit 110. The pre-processing network 120 can be formed as an artificial neural network such as a CNN and can perform pre-processing by estimating the pattern of the raw data image according to a pattern estimation method learned beforehand.

The encoder unit 130 may receive the pre-processed image and may encode and compress the pre-processed image according to a pre-designated standard compression technique. Here, the encoder unit 130 can compress the pre-processed image by using a block-based coding technique or a prediction-based coding technique. For instance, if the acquired raw data image is a still image, a compression standard technique such as JPEG, JPEG2000, etc., can be applied, and if the acquired raw data image is a video clip, a compression standard technique such as H.264, HEVC, etc., can be applied. However, the disclosure is not limited thus, and the encoder unit 130 can compress an image according to any of a variety of compression standard techniques other than those mentioned above.

The image compressed by the encoder unit 130 can be transmitted in a bit stream form to the image restoration unit 200. As described above, since image compression technology is for enhancing the efficiency of transmission and storage by expressing image data in a small number of bits while maintaining the quality of the image as close as possible to the original, the compressed image compressed by the encoder unit 130 and transmitted may have a smaller number of bits compared to the raw data image, where the number of bits of the compressed image from the encoder unit 130 can be varied according to the compression rate.

The image restoration unit 200 can include a decoder unit 210 that receives the compressed image and decodes the compressed image in a pre-designated manner and a post-processing unit 220 that post-processes the decoded image in a pre-designated manner to improve the quality of the image.

The decoder unit 210 may receive the compressed image and may decode the compressed image, by a decoding method that corresponds to the standard compression technique applied to the compressed image, to acquire a decoded image. That is, the decoder unit 210 may acquire the decoded image by decoding the compressed image with a decoding technique corresponding to the standard compression technique applied to the compressed image at the encoder unit 130 of the image compression unit 100. Here, the decoder unit 210 can be aware of the standard compression technique applied at the encoder unit 130 beforehand or can determine the file technique that should be applied based on the file format, etc., of the received compressed image. That is, it is possible to determine the compression technique by using the file extension, file header, metadata, etc., and apply a corresponding decoding technique.

The post-processing unit 220 may receive the decoded image decoded at the decoder unit 210 and may restore the decoded image to be as close as possible to the original data image by applying at least one of various post-processing techniques designated for image quality enhancement. As the various post-processing techniques are publicly known, detailed descriptions of these techniques are omitted here. In some cases, the post-processing unit 220 itself can be omitted.

As described above, in an image compression system according to this embodiment, a pre-processing network 120 may be provided in the image compression unit 100 to further improve the quality of the restored image acquired at the image restoration unit 200. In particular, the pre-processing network 120 may be arranged at the front end of the encoder unit 130 to apply pre-processing on the raw data image, before the image is compressed at the encoder unit 130, as a way to improve the quality of the restored image.

As this can improve the quality of the restored image without modifying the encoder unit 130 and decoder unit 210, where the standard image compression technique is applied, it is possible to improve the image quality while maintaining the compatibility of the standard compression technique.

As described above, however, the pre-processing network 120 can be implemented as an artificial neural network, and in order for a pre-processing network 120 implemented as an artificial neural network to provide a performance of image quality improvement, it may have to undergo learning beforehand.

To apply learning to the pre-processing network 120, it may be required to analyze the error between a decoded image that was pre-processed by the pre-processing network 120, compressed, and decoded or a restored image that was further post-processed by the post-processing unit 220 and the raw data image acquired by the image acquisition unit 110, and then backpropagate the analyzed error to the pre-processing network 120.

It is well known that a precondition of learning by backpropagation of error in an artificial neural network is differentiability. Therefore, to enable the backpropagation of error to the pre-processing network 120, the encoder unit 130 and decoder unit 210 which serve as a codec for compressing and decoding images may have to perform differentiable operations.

However, an encoder unit 130 and decoder unit 210 that perform operations designated according to a standard compression technique generally do not perform differentiable operations, presenting a difficulty in the learning of the pre-processing unit 120.

As such, an embodiment of the disclosure can further include a learning unit for the learning of the pre-processing network 120, where the learning unit can include a codec modeling unit 500 and an image learning unit 600.

In FIG. 1, the encoder unit 130 and decoder unit 210 that compresses and decodes an image according to a standard compression technique can be regarded as a standard codec unit. The codec modeling unit 500 can be an element for modeling the standard codec unit, which includes the encoder unit 130 and the decoder unit 210, and can be formed as an artificial neural network to allow error backpropagation instead of the encoder unit 130 and decoder unit 210, which do not allow error backpropagation, so that learning may be performed.

Since the pre-processing network 120 is provided to improve the quality of the restored image as described above, it does not matter if the method by which the encoder unit 130 compresses a pre-processed image and the method by which the decoder unit 210 decodes a compressed image are unknown during the learning of the pre-processing network 120. All that is needed is the capability of backpropagating the error of the compressed and decoded result. Thus, this embodiment enables the learning of the pre-processing network 120 by providing a codec modeling unit 500 that simulates the standard codec unit.

The codec modeling unit 500 can include a codec modeling network 510, a bit estimation network 520, and a model learning unit 530.

The codec modeling network 510 may be provided to simulate the standard codec unit. The codec modeling network 510 can be implemented as an artificial neural network that has learned beforehand to receive the image pre-processed by the pre-processing network 120 and output an image that is as identical as possible to the decoded image outputted at the decoder unit 210.

The codec modeling network 510 may simulate the standard codec unit so as to enable the pre-processing network 120 to acquire an efficient representation capable of yielding an optimum compression rate (compact representation) and transfer a feedback gradient for the error as a differentiable operation.

Thus, the codec modeling network 510 may be composed to simulate the functions of the standard codec unit as identically as possible and, since the codec modeling network 510 is used only during learning, can have a sufficient degree of complexity. The codec modeling network 510 can be implemented, for example, as a CNN or a RNN (recurrent neural network).

FIG. 2 illustrates an example in which the codec modeling network 510 is implemented as a CNN under the assumption that a standard codec using a block-based coding technique is simulated. As illustrated in FIG. 2, a codec modeling network 510 implemented as a CNN can include an encoder simulator unit 511 and a decoder simulator unit 512. The encoder simulator unit 511 may receive a pre-processed image, rearrange it into block units of a pre-designated size, apply iterative filtering on the rearranged data through multiple encoding filters that each include a convolution layer CL and a leaky rectified linear unit layer ReLU, and output the result. The decoder simulator unit 512 can be formed to output the result after applying iterative filtering on the output of the encoder simulator unit 511 through multiple decoding filters, each of which includes a convolution layer CL and a leaky rectified linear unit layer ReLU and is coupled with the convolution layer of a corresponding convolution filter from among the multiple encoding filters of the encoder simulator unit 511.

In cases where the codec modeling network 510 simulates a standard codec according to a prediction-based coding technique, the codec modeling network 510 can be formed based on a RNN structure such that a modeled block is used for the modeling of the next block.

The codec modeling network 510 may require learning to output a simulated decoded image corresponding to a decoded image that would be outputted from the decoder unit 210 after a pre-processed image is received from the pre-processing network 120, and the learning can be performed by the model learning unit 530.

The model learning unit 530 can apply learning for the codec modeling network 510 by receiving a simulated decoded image outputted from the codec modeling network 510 and a decoded image outputted from the decoder unit 210, calculating the modeling error between the simulated decoded image and the decoded image, and backpropagating the calculated modeling error to the codec modeling network 510. Here, the model learning unit 530 can calculate the modeling error by applying a mean squared error or a mean absolute error of pixels as a loss function between the simulated decoded image and the decoded image and can backpropagate the calculated error to the codec modeling network 510.

The bit estimation network 520 may be an element for estimating the number of bits of the compressed image compressed at the encoder unit 130 from the image pre-processed at the pre-processing network 120 so that the codec modeling network 510 may more precisely simulate the standard codec unit.

If the codec modeling network 510 is learned simply to derive results as identical as possible to those of the standard codec unit, then the pre-processing network 120 would perform learning without consideration of the number of bits of the compressed image. However, since the pre-processing network 120 in this embodiment is added to perform pre-processing for enhancing image quality by optimizing the compression efficiency of the encoder unit 130, the pre-processing network 120 should perform learning in consideration of the compression rate of the encoder unit 130.

Thus, to allow the pre-processing network 120 to learn with the compression rate of the encoder unit 130 considered, this embodiment may further include a bit estimation network 520 that receives the pre-processed image and estimate the number of bits of the compressed image. As illustrated in FIG. 3, the bit estimation network 520 can also be implemented as a CNN. Referring to FIG. 3, the bit estimation network 520 can include a bit compression unit 521 and a bit extraction unit 522. The bit compression unit 521 may receive a pre-processed image, rearrange the pre-processed image into block units of a pre-designated size, and iteratively filter the rearranged data through a multiple number of compression filters that each include a convolution layer CL, a leaky rectified unit layer ReLU, and a batch normalization layer BAT, with the convolution layers CL in an increasing order. The bit extraction unit 522 may estimate the number of bits by way of an iterative filtering using a multiple number of extraction filters that each include a convolution layer CL, a leaky rectified unit layer ReLU, and a batch normalization layer BAT, with the convolution layers CL in a decreasing order.

The bit estimation network 520 can also perform learning by a model learning unit 530. The model learning unit 530 may apply learning for the bit estimation network 520 by calculating the difference in numbers of bits between the estimated bit number estimated by the bit estimation network 520 from a pre-processed image and the bit number of the compressed image obtained as the encoder unit 130 actually compresses the pre-processed image, obtaining the calculated difference in bit numbers as a bit error, and backpropagating the bit error to the bit estimation network 520. That is, the learning can be performed to enable the bit estimation network 520 to accurately estimate the number of bits of the compressed image.

During the model learning for simulating the standard codec unit, the codec modeling network 510 and bit estimation network 520 of the codec modeling unit 500 may vary the weights of the convolution layers according to the modeling error and bit error backpropagated at the model learning unit 530. The model learning can be performed until the modeling error and the bit error fall to or below a pre-designated threshold error or until a pre-designated number of iterations have been reached.

When the model learning for the codec modeling unit 500 is complete, the weights of the codec modeling network 510 and bit estimation network 520 may be fixed and may remain unchanged thereafter.

The image learning unit 600 may be provided to apply learning for the pre-processing network 120 by using the learned codec modeling unit 500. The pre-processing network 120 can perform learning in a pre-processing learning step after the model learning has been completed.

The image learning unit 600 may receive the raw data image from the image acquisition unit 110 as well as the restored image that was post-processed by the post-processing unit 220 and may then calculate the restoration error as the difference between the raw data image and the restored image. Here, the restoration error can also be obtained by applying a mean error or a mean absolute error of pixels as a loss function between the raw data image and the restored image. The restoration error thus obtained may be backpropagated to apply learning for the pre-processing network 120.

As described above, however, the restoration error obtained at the image learning unit 600 may have to be backpropagated as a feedback gradient and cannot be backpropagated through the decoder unit 210 and encoder unit 130. As such, the image learning unit 600 can apply learning for the pre-processing network 120 by backpropagating the obtained restoration error to the pre-processing network 120 through the codec modeling unit 500 simulating the standard codec unit.

For the codec modeling network 510 and bit estimation network 520 of the codec modeling unit 500 simulating the standard codec unit, once the model learning is performed and the weights are configured, the configured weights may remain unchanged in the subsequent pre-processing learning. This is because it is desirable that the codec modeling unit 500 always maintain the properties for simulating the standard codec unit if the pre-processing network 120 is to perform learning accurately.

Although FIG. 1 illustrates an example in which the image learning unit 600 backpropagates the restoration error through the model learning unit 530 of the codec modeling unit 500, the image learning unit 600 can backpropagate the restoration error directly to the codec modeling network 510 and the bit estimation network 520 to apply learning for the pre-processing network 120. In such cases, it is possible to have the model learning unit 530 of the codec modeling unit 500 removed after the model learning is complete.

Also, although the descriptions herein refer to the image learning unit 600 and the model learning unit 530 as separate elements, this is for convenience only, and it is possible to have the image learning unit 600 and the model learning unit 530 integrated.

Here, the learning unit, which includes the codec modeling unit 500 and the image learning unit 600, can be an element added for the learning of the pre-processing network 120 and thus can be removed when the learning of the pre-processing network 120 is complete.

Figure 4:
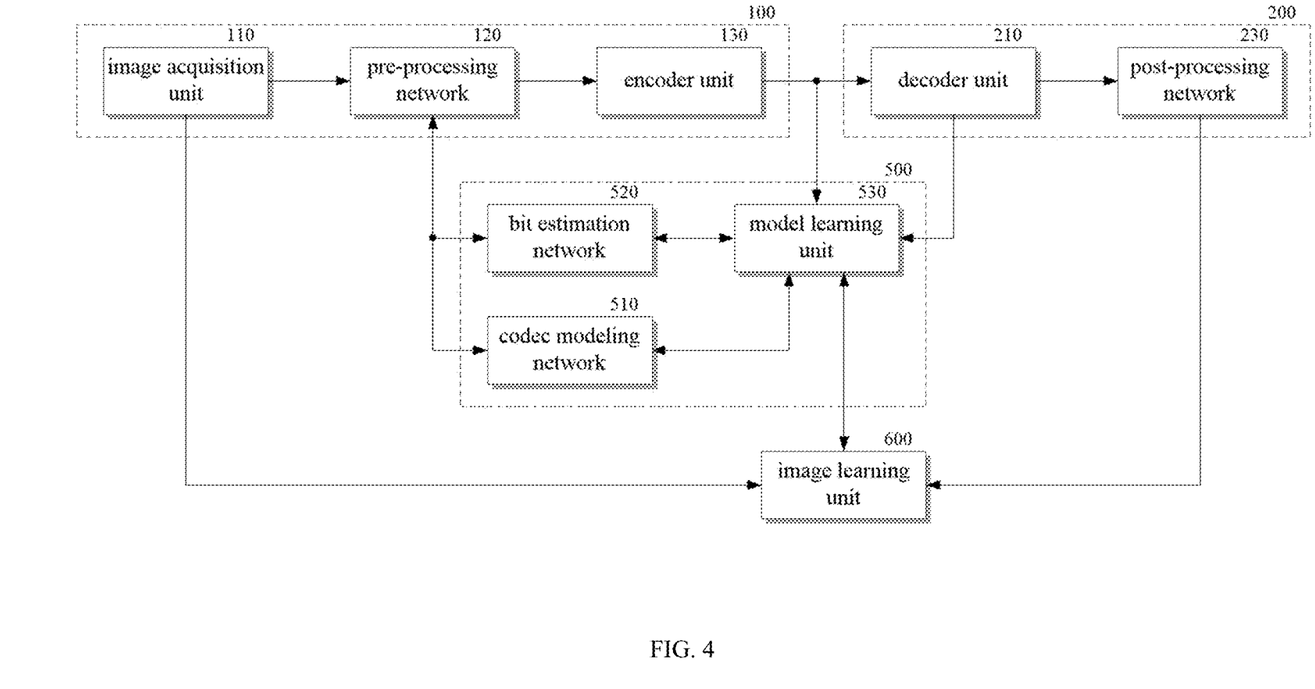
FIG. 4 illustrates the structure of an image compression system according to another embodiment of the disclosure.

FIG. 4 illustrates the structure of an image compression system according to another embodiment of the disclosure.

Compared to the image compression system of FIG. 1, in the image compression system of FIG. 4, the image restoration unit 200 may include a post-processing network 230 instead of the post-processing unit 220 that performs designated operations. The post-processing network 230 may be implemented as an artificial neural network and may be configured to obtain a restored image having an improved image quality from the decoded image decoded at the decoder unit 210 according to a learned pattern.

In cases where the image restoration unit 200 includes the post-processing network 230, the post-processing network 230 as well as the pre-processing network 120 may require learning, and in cases where the pre-processing network 120 and the post-processing network 230 perform learning together, it is possible to obtain a restored image that has a greatly improved image quality. That is, a restored image can be obtained that is very close to the raw data image, even with the compression rate greatly increased by the standard codec unit for a smaller number of bits.

The post-processing network can be implemented as any of a variety of artificial neural networks, such as, for example, the SRCNN (super-resolution CNN) or ARCNN (artifact removal CNN), etc., used for post-processing in existing image compression systems.

In the image compression system of FIG. 1, the post-processing unit 220 does not require learning, and therefore, the image learning unit 600 may receive the restored image obtained at the post-processing unit 220 and backpropagate the restored image immediately to the codec modeling unit 500.

However, in cases where it is necessary to apply learning to the post-processing network 230 and the pre-processing network 120 as in FIG. 4, the post-processing network 230 may have to be additionally included in the path of backpropagation of error. Thus, in FIG. 4, the image learning unit 600 may receive the raw data image from the image acquisition unit 110 and may further receive the restored image post-processed at the post-processing network 230, calculate the difference between the raw data image and the restored image as a restoration error, and backpropagate the calculated restoration error to the post-processing network 230 to apply learning for the post-processing network 230. Also, the model learning unit 530 may receive the error backpropagated from the post-processing network 230 and backpropagate the error through the codec modeling network 510 and bit estimation network 520 to the pre-processing network 120. In this way, the pre-processing network 120 and the post-processing network 230 may learn together. Here, the codec modeling network 510 and the bit estimation network 520 may maintain the learned state achieved during the model learning, as already described above.

Ultimately, the image compression system of FIG. 4 can form not only the pre-processing network 120 but also the post-processing network 230 as artificial neural networks and have the two learn simultaneously in cooperation with each other, so that the compression rate may be greatly increased when encoding and decoding are performed using a standard codec. That is, the quality of the restored image can be improved.

Also, since the image quality can be improved by using pre-processing and post-processing without altering the operations performed at the encoder unit 130 and the decoder unit 210, which form the standard codec unit, it is possible to improve image quality while maintaining compatibility with standard compression techniques.

Here also, the learning unit made up of the codec modeling unit 500 and the image learning unit 600 can be an element added for the learning of the pre-processing network 120 and post-processing network 230 and therefore can be removed once the learning of the pre-processing network 120 is complete.

Figure 5:
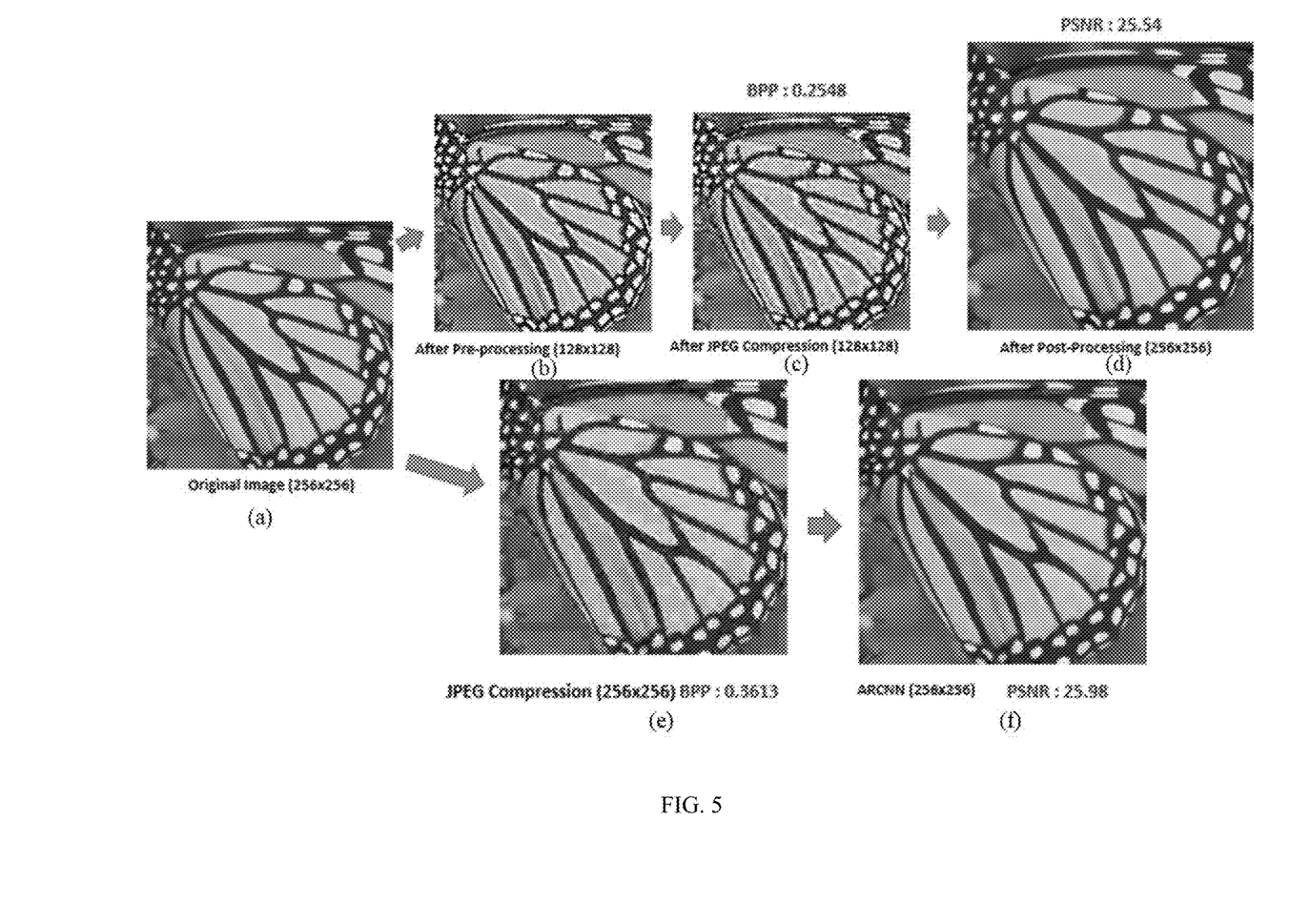
FIG. 5 shows simulation results illustrating the performance of an image compression system according to an embodiment of the disclosure.

FIG. 5 shows simulation results illustrating the performance of an image compression system according to this embodiment.

In FIG. 5, image (a), showing an image of a butterfly wing, is a raw data image acquired by the image acquisition unit 110, image (b) is an image pre-processed by the pre-processing network 120, and image (c) is an image compressed and decoded according to the JPEG standard compression technique. Image (d) is an image post-processed by the post-processing network 230.

For comparison, image (e) is an image after compressing and decoding the raw data image without pre-processing, and image (f) is an image post-processed by an ARCNN.

Comparing image (d) and image (f) in FIG. 5, it can be seen that the restored images have similar image quality levels (PSNR), but comparing image (c) and image (e), it can be seen that the bit per pixel (BPP) value is 0.2548 for image (c) but 0.3613 for image (e), showing that the compression rate is drastically higher for the case of performing pre-processing.

Figure 6:
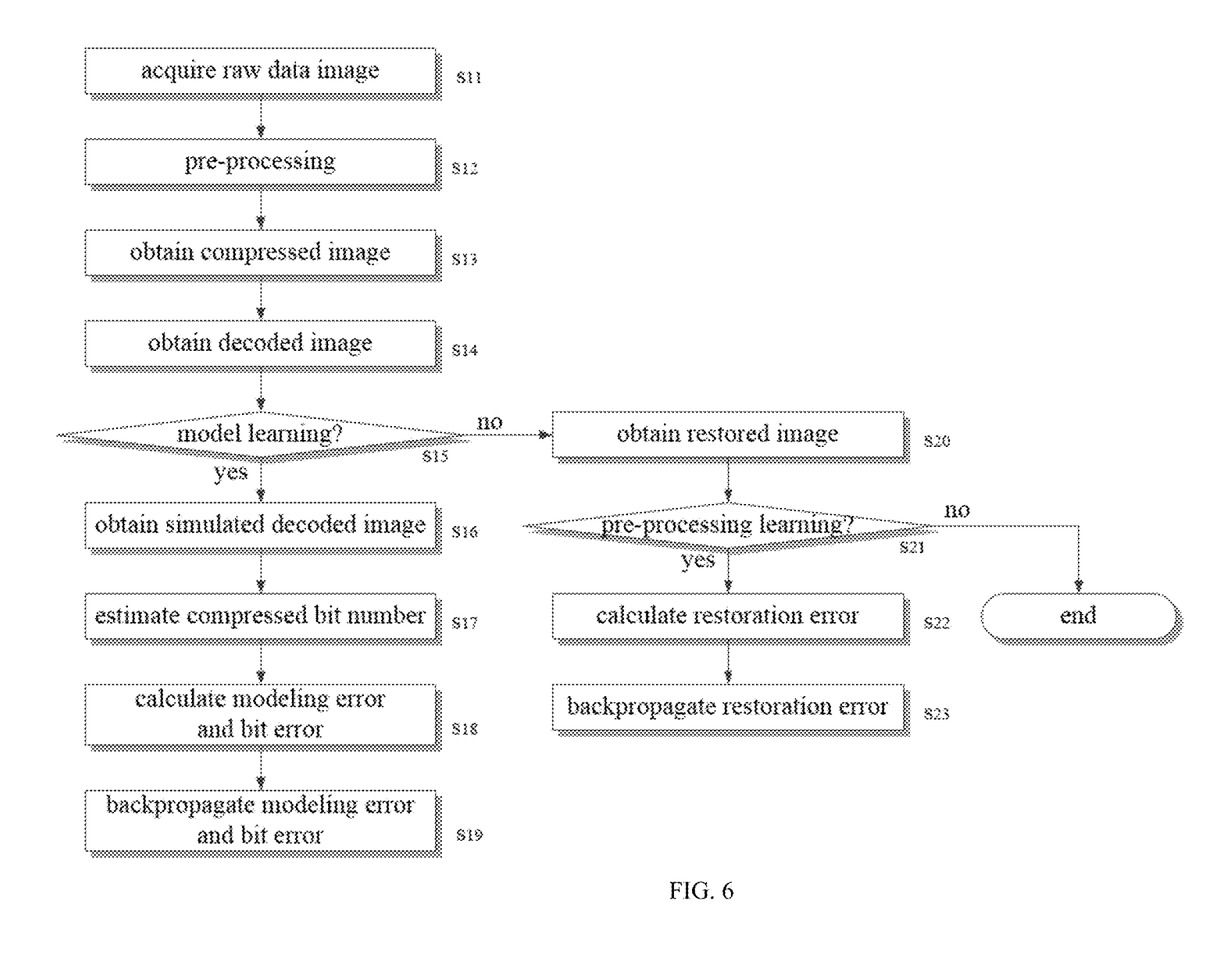
FIG. 6 illustrates an image compression method and a learning method according to an embodiment of the disclosure.

FIG. 6 illustrates an image compression method and a learning method according to an embodiment of the disclosure.

The image compression method and learning method of FIG. 6 are described below with reference to FIGS. 1 to 4. First, the raw data image that is to be compressed may be acquired (S11). Then, the acquired raw data image may be pre-processed according to a learned pattern estimation method (S12). When the pre-processed image is obtained, the pre-processed image may be compressed according to a pre-designated standard compression technique, and the compressed image may be transmitted (S13). Afterwards, the compressed image may be received and decoded to obtain a decoded image (S14).

Then, it may be determined whether or not the process is at the model learning phase (S15). If it is determined that the process is at the model learning phase, then a simulated decoded image may be obtained by using a codec modeling network 510 that simulates and outputs the result of compressing and decoding the pre-processed image according to a standard compression technique (S16). Also, the number of bits of the compressed image may be estimated by using the bit estimation network 520 that has been configured to estimate the bit number of the compressed image compressed according to the standard compression technique from the pre-processed image (S17).

Afterwards, the modeling error may be calculated by comparing the simulated decoded image and the decoded image obtained above, and the bit error may be calculated by comparing the number of bits of the compressed image and the estimated number of bits (S18). The calculated modeling error and bit error may be backpropagated to the codec modeling network 510 and the bit estimation network 520, respectively, to apply learning for the codec modeling network 510 and the bit estimation network 520 (S19).

The codec modeling network 510 and the bit estimation network 520 can undergo learning iteratively until the modeling error and bit error fall to or below threshold modeling error and threshold bit error values designated beforehand or until a pre-designated number of iterations is reached. When the model learning for the codec modeling network 510 and the bit estimation network 520 is completed, the weights of the codec modeling network 510 and bit estimation network 520 may be fixed.

However, if it is determined that the process is not at the model learning phase, a restored image may be obtained by performing a pre-designated post-processing on the obtained decoded image (S20). In some cases, the post-processing can be performed according to a pattern estimation method learned beforehand. When the restored image is obtained, it may be determined whether or not the process is at the pre-processing learning phase (S21). If it is determined that the process is at the pre-processing learning phase, the restoration error may be calculated by comparing the obtained restored image with the raw data image (S22). The calculated restoration error may be backpropagated through the codec modeling network 510 and the bit estimation network 520 to apply learning to the pre-processing network 120 (S23). Here, if the post-processing unit 220 performing post-processing is a post-processing network 230 implemented as an artificial neural network, then the calculated restoration error may first be backpropagated to the post-processing network 230 and then backpropagated from the post-processing network 230 through the codec modeling network 510 and the bit estimation network 520 to the pre-processing network 120, so that learning may be applied simultaneously to the pre-processing network 120 and the post-processing network 230.

However, if it is determined that the process is not at the post-processing learning phase, then the process may end.

A method according to an embodiment of the disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. An image compression apparatus comprising:
   an image acquisition unit configured to acquire a raw data image;
   a pre-processing network configured to receive the raw data image and pre-process the raw data image according to a pattern estimation method learned beforehand; and
   an encoder unit configured to receive the pre-processed image and compress the pre-processed image according to a pre-designated standard compression technique to output a compressed image,
   wherein the pre-processing network is added during learning and is implemented as an artificial neural network, and the pre-processing network has learned beforehand by way of a backpropagation of a restoration error through a codec modeling unit, the codec modeling unit having learned beforehand to simulate a standard codec unit comprising the encoder unit and a decoder unit configured to obtain a decoded image by receiving and decoding the compressed image, the restoration error obtained by comparing a restored image with the raw data image, the restored image obtained based on a simulated decoded image outputted from the codec modeling unit.

2. The image compression apparatus of claim 1, wherein the codec modeling unit comprises:
   a codec modeling network having learned to simulate the standard codec unit comprising the encoder unit and the decoder unit, the codec modeling network configured to receive the compressed image and output a simulated decoded image corresponding to a decoded image;
   a bit estimation network configured to receive the pre-processed image pre-processed at the pre-processing network and estimate a number of bits of the compressed image outputted from the encoder unit based on the pre-processed image according to a pattern estimation method learned beforehand; and
   a model learning unit configured to backpropagate a modeling error to the codec modeling network and backpropagate a bit error to the bit estimation network during model learning for applying learning for the codec modeling network and the bit estimation network, the model learning unit configured to obtain the modeling error by comparing the simulated decoded image with the decoded image obtained at the decoder unit and configured to obtain the bit error by comparing a bit number estimated at the bit estimation network with a bit number of the compressed image outputted from the encoder unit.

3. The image compression apparatus of claim 2, further comprising:
   an image learning unit configured to be added during pre-processing learning for applying learning to the pre-processing network, the image learning unit configured to obtain a restoration error and backpropagate the restoration error through the codec modeling network and the bit estimation network to the pre-processing network, the restoration error obtained by comparing the restored image obtained by post-processing the decoded image or the simulated decoded image in a pre-designated manner with the raw data image.

4. The image compression apparatus of claim 3, wherein the model learning unit fixes weights of the codec modeling network and the bit estimation network configured by the model learning during the pre-processing learning.

5. The image compression apparatus of claim 4, wherein the restored image is obtained from the decoded image or the simulated decoded image by way of post-processing by a post-processing network, the post-processing network implemented as an artificial neural network having learned a pattern estimation method beforehand, and the image learning unit backpropagates the restoration error first to the post-processing network, past the codec modeling network and the bit estimation network, to the pre-processing network.

6. A learning apparatus for an image compression apparatus, the image compression apparatus comprising a pre-processing network and an encoder unit, the pre-processing network configured to receive a raw data image and pre-process the raw data image according to a pattern estimation method learned beforehand, the encoder unit configured to receive the pre-processed image, compress the pre-processed image according to a pre-designated standard compression technique, and output a compressed image, the learning apparatus comprising:
- a codec modeling unit implemented as an artificial neural network and having learned beforehand to simulate a standard codec unit so as to obtain a simulated decoded image from the pre-processed image, the standard codec unit comprising the encoder unit and a decoder unit configured to obtain a decoded image by receiving and decoding the compressed image; and
- an image learning unit configured to apply learning for the pre-processing network by obtaining a restoration error and backpropagating the restoration error through the codec modeling unit, the restoration error obtained by comparing a restored image with the raw data image, the restored image obtained based on the simulated decoded image outputted from the codec modeling unit.

7. The learning apparatus for an image compression apparatus according to claim 6, wherein the codec modeling unit comprises:
- a codec modeling network learned to simulate the standard codec unit comprising the encoder unit and the decoder unit and configured to receive the compressed image and output the simulated decoded image corresponding to the decoded image;
- a bit estimation network configured to receive the pre-processed image pre-processed at the pre-processing network and estimate a number of bits of the compressed image outputted by the encoder unit from the pre-processed image according to a pattern estimation method learned beforehand; and
- a model learning unit configured to backpropagate a modeling error to the codec modeling network and backpropagate a bit error to the bit estimation network during model learning for applying learning for the codec modeling network and the bit estimation network, the model learning unit configured to obtain the modeling error by comparing the simulated decoded image with the decoded image obtained at the decoder unit and configured to obtain the bit error by comparing a bit number estimated at the bit estimation network with a bit number of the compressed image outputted from the encoder unit.

8. The learning apparatus for an image compression apparatus according to claim 7, wherein image learning unit is configured to obtain a restoration error and backpropagate the restoration error through the codec modeling network and the bit estimation network to the pre-processing network during pre-processing learning for applying learning to the pre-processing network, the restoration error obtained by comparing the restored image obtained by post-processing the decoded image or the simulated decoded image in a pre-designated manner with the raw data image.

9. The learning apparatus for an image compression apparatus according to claim 8, wherein the model learning unit fixes weights of the codec modeling network and the bit estimation network configured by the model learning during the pre-processing learning.

10. The learning apparatus for an image compression apparatus according to claim 9, wherein the restored image is obtained from the decoded image or the simulated decoded image by way of post-processing by a post-processing network, the post-processing network implemented as an artificial neural network having learned a pattern estimation method beforehand, and the image learning unit backpropagates the restoration error first to the post-processing network, past the codec modeling network and the bit estimation network, to the pre-processing network.

11. A learning method for an image compression apparatus, the image compression apparatus comprising a pre-processing network and an encoder unit, the pre-processing network configured to receive a raw data image and pre-process the raw data image according to a pattern estimation method learned beforehand, the encoder unit configured to receive the pre-processed image, compress the pre-processed image according to a pre-designated standard compression technique, and output a compressed image, the learning method comprising:
- obtaining a simulated decoded image from the pre-processed image by using an artificial neural network, the artificial neural network having learned beforehand to simulate a standard codec unit comprising the encoder unit and a decoder unit configured to obtain a decoded image by receiving and decoding the compressed image; and
- applying learning for the pre-processing network by obtaining a restoration error and backpropagating the restoration error through the artificial neural network, the restoration error obtained by comparing a restored image with the raw data image, the restored image obtained based on the simulated decoded image.

12. The learning method for an image compression apparatus according to claim 11, wherein the obtaining of the simulated decoded image comprises:
- receiving the compressed image and using the artificial neural network having the pattern estimation method learned beforehand to obtain a simulated decoded image corresponding to the decoded image; and
- estimating a number of bits of the compressed image outputted from the encoder unit from the pre-processed image by using an artificial neural network independent of the artificial neural network for obtaining the simulated decoded image according to a pattern estimation method learned beforehand.

13. The learning method for an image compression apparatus according to claim 12, further comprising:
- a model learning phase before the obtaining of the simulated decoded image,
- wherein the model learning phase comprises obtaining a modeling error and a bit error and backpropagating the modeling error and the bit error to corresponding artificial neural networks respectively, the modeling error obtained by comparing the simulated decoded image with the decoded image obtained at the decoder unit, the bit error obtained by comparing an estimated bit number with a bit number of the compressed image outputted at the encoder unit.

14. The learning method for an image compression apparatus according to claim 13, wherein the applying of learning for the pre-processing network comprises:
- obtaining a restoration error by comparing a restored image with the raw data image during pre-processing learning for applying learning for the pre-processing network, the restored image obtained by post-processing the decoded image or the simulated decoded image in a pre-designated manner; and
- backpropagating the obtained restored image through the artificial neural networks to the pre-processing network.

15. The learning method for an image compression apparatus according to claim 14, wherein the restored image is obtained from the decoded image or the simulated decoded image by way of post-processing by a post-processing network, the post-processing network implemented as an artificial neural network having learned a pattern estimation method beforehand, and the applying of learning for the pre-processing network comprises backpropagating the restoration error first through the post-processing network, past the codec modeling network and the bit estimation network, to the pre-processing network.

* * * * *